United States Patent

[11] 3,550,859

| [72] | Inventor | Edgar E. Pettit<br>Houston, Tex. |
|---|---|---|
| [21] | Appl. No. | 749,192 |
| [22] | Filed | July 31, 1968 |
| [45] | Patented | Dec. 29, 1970 |
| [73] | Assignee | Herlon Industries, Inc.<br>a corporation of Texas |

[54] SPRINKLER APPARATUS
6 Claims, 3 Drawing Figs.

[52] U.S. Cl. ..................... 239/468,
239/491; 55/447
[51] Int. Cl. ..................... B05b 1/34
[50] Field of Search ............ 239/468,
486, 491, 492; 55/447

[56] References Cited
UNITED STATES PATENTS

| 1,780,233 | 11/1930 | Jenkins.................. | 239/468X |
| 2,519,738 | 8/1950 | Butler.................... | 239/468 |
| 2,815,248 | 12/1957 | O'Brien.................. | 239/468 |

FOREIGN PATENTS

| 1,144,009 | 4/1957 | France................... | 239/468 |
| 1,262,920 | 4/1961 | France................... | 239/468 |

Primary Examiner—M. Henson Wood
Assistant Examiner—Michael Y. Mar
Attorney—Carl B. Fox, Jr.

ABSTRACT: Sprinkler apparatus of the type having a water circulation chamber, a tangential water entrance, and an upper concentric water outlet. The apparatus has particular size ratios for the inlet and outlet, and the entrance is of special design to prevent turbulence within the water circulation chamber.

PATENTED DEC29 1970

3,550,859

Edgar E. Pettit
INVENTOR.

BY Carl B. Fox, Jr.
ATTORNEY

SPRINKLER APPARATUS

BACKGROUND OF THE INVENTION

1. Field of the Invention

The field of the invention is the field pertaining to sprinkler or spray apparatus, particularly for spraying water for lawn watering and irrigation purposes, the spray apparatus being of a type producing high water-spraying capacity and special nonclogging features. The apparatus may be made in small sizes for home use, and in larger sizes for farm, orchard, and ranch use.

2. Discussion of the Prior art

The prior art includes the following U.S. Pat. Nos. 443,734, D. C. Wilgus; 491,354, J. Jett; 545,320, J. P. Van Sickle; 569,243, L. H. Sholder; 911,716, H. Gibbs; 975,321, C. A. Borgeson; 1,045,242, J. R. Wright; 1,430,620, A. K. Brauer, Dec'd.; 1,511,940, F. W. Boyer; 1,615,010, F. A. Gerding; 1,605,325, C. A. Borgeson; 1,631,381, L. R. Nelson; 1,780,233, H. Jenkins; 1,825,640, C. S. Wert; 2,519,738, G. L. Butler; and 2,815,248, E. J. O'Brien.

The disclosures of the prior art patents do not include certain novel features of the invention, including the specification of inlet-outlet size ratios and the particular form and disposition of the inlet to the water circulation compartment. The sprinkler apparatus according to the invention has the advantage that it will spray efficiently at all pressures and water flow rates, that it is not subject to clogging, that it has higher spraying efficiency than prior devices, and that it is of greater durability and long service.

SUMMARY OF THE INVENTION

The invention presents apparatus wherein water is introduced through an inlet tangentially into a water circulation chamber and the water spirally traverses the water circulation chamber to exit centrally at the upper side of the apparatus. The water entrance construction of the apparatus is designed such that the water within the circulation chamber, will, at any rate of flow and at substantially any pressure, circulate smoothly without turbulence so that a uniform, uninterrupted spray is produced through the outlet. The apparatus according to the invention has the further advantage that it is economically and easily made from commercially available components without necessity for formation of shaped components.

A principal object of the invention is to provide spray apparatus which will produce a uniform spray regardless of variations in water supply pressure thereto.

Another advantage of the invention is to provide such apparatus which is simple, inexpensive to manufacture, yet is entirely dependable and not subject to clogging.

Other objects of the invention will appear from the detailed description of the preferred embodiment of the invention.

DESCRIPTION OF THE PREFERRED EMBODIMENT

Figures 1, 2, 3:
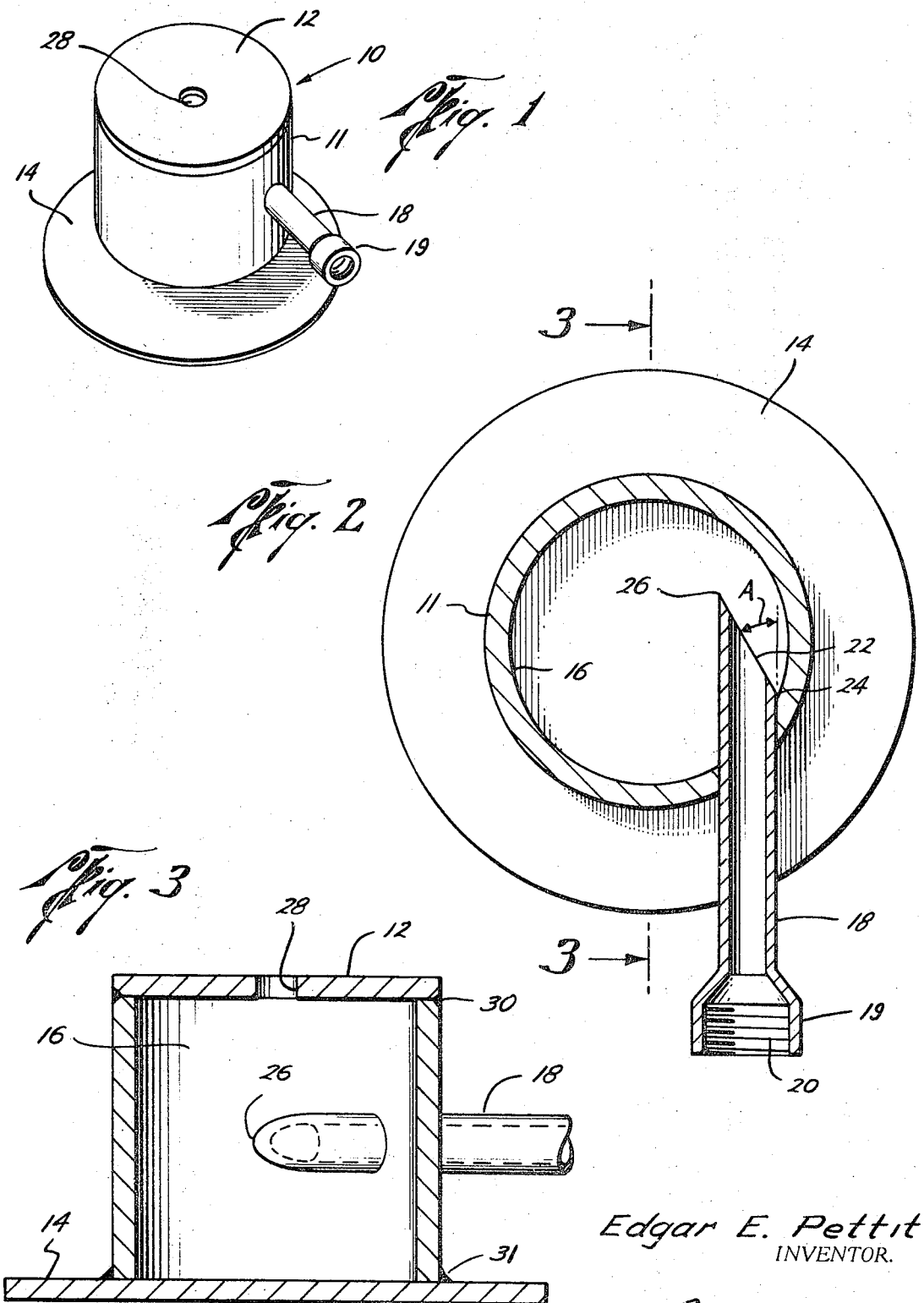
FIG. 1 is an upper perspective view showing an apparatus of preferred form according to the invention.
FIG. 2 is a horizontal cross-sectional view of the apparatus shown in FIG. 1, taken at the axis of the inlet.
FIG. 3 is a vertical cross-sectional view taken at line 3–3 of FIG. 2.

Referring now to the drawings in detail, and first to FIG. 1, there is shown a sprinkler apparatus 10 including a hollow cylindrical body or housing 11 closed at its upper end by a flat circular top 12. The bottom or base of the apparatus is of circular form, formed by a flat metal plate 14 disposed concentrically with the cylindrical housing 11.

Referring now also to FIGS. 2 and 3, the inlet through which water is introduced into the circulation chamber 16 within the housing 11 is in the form of a cylindrical conduit 18 having a coupling enlargement 19 interiorly threaded at 20 to form a threaded socket into which the threaded male end of a hose or pipe may be screwed. Suitable washers (not shown) or other seal means may be disposed within the socket to prevent leaks at the connection.

Inlet conduit 18 is conveniently welded into place through an opening through the housing wall formed to closely fit the inlet conduit angularly disposed therethrough. The inner end 22 of inlet pipe 15 is at an angle, the angle being indicated as angle A, and the angle being measured between a line parallel with the longitudinal axis of the inlet pipe and the plane of the face of the angular pipe end. The outer side of the angular pipe end, indicated by reference numeral 24, is preferably disposed at or substantially at the inner surface or the curved wall of housing 11, the angular end of the pipe being disposed in a vertical plane. The inlet pipe terminates inwardly at an elliptically curved tip 26.

The size of angle A has been determined to be important, and is preferably 33°. Angles varying somewhat from 33° may be satisfactorily employed, in the range of about 23° to about 43°, but departure of the angle from this range seriously affects the performance of the apparatus and is not recommended.

The importance of the size of angle A may be explained as follows: if the space between the angular end of the inlet pipe and the housing wall is too narrow or small, so that flow restriction results, then turbulence and a "squirting" action occurs at this point and water circulation is interrupted to produce an unsatisfactory spray. On the other hand, if angle A is too large, then eddy currents develop around tip 26 of the inlet pipe, which interrupts water circulation causing poor spraying action.

As seen best in FIG. 2, the angular end of pipe 18 and the portion of the interior curved wall surface of chamber 16 form a space therebetween which is not restrictive of the incoming water flow. The point 24 is positioned so that, with angle A of correct magnitude, this flow space is provided. Tip 26 should be about one inlet pipe diameter away from the chamber wall.

The water outlet opening 28 is disposed concentrically through circular top 12. The outlet 28 may be conically beveled at its upper or lower end, or at both ends, but such beveling is not necessary and does not enhance or really affect the spraying action. Outlet opening 28 should be sized so that flow restriction is not caused thereby, in other words, the outlet 28 should be substantially as large as the internal diameter of the inlet conduit 18, or larger. If the outlet opening 28 is substantially smaller than the inlet size, then an overloading action takes place within the chamber 16 which is detrimental to the quality of the spray derived.

The diameter of outlet opening 28, which as stated should not be substantially less than the inlet conduit opening size, may be considerably larger if high water pressures are delivered to the spraying apparatus. For ordinary water pressures as supplied to homes, up to approximately 50 or 60 pounds per square inch, then the outlet 28 should be of the size of the inlet pipe internal diameter, or slightly larger. On the other hand, if water pressures introduced through conduit 18 are higher, then outlet 28 may be larger although this enlargement is not necessary. For example, if a water pressure of 500 to 700 pounds per square inch is supplied through inlet pipe 18, then the diameter of opening 28 may be as large as about two-thirds of the diameter of the water circulation chamber 16. At higher pressures, outlet 28 may be even further enlarged, although it is necessary to leave a top flangelike formation surrounding the upper end of the circulation chamber about equal to the internal diameter of conduit 18.

In the prior art, it is frequently found that the outlet openings in this general type of spray apparatus have been made smaller than the inlet, and, as stated above, this is not recommended according to the invention. It appears from extensive testing that if the outlet is materially smaller than the inlet, then the flow circulation within the circulation chamber is overloaded or choked, which results in seriously inferior spraying action. Stated in other words, there should not be a flow restriction at the outlet, and instead, any flow restriction caused by demunition of flow passages, should occur at the inlet instead of at the outlet so that circulation and flow through the apparatus are not hindered.

It is also important that the top 12 of the circulation chamber be flat or at least nearly flat. Concave or convex conical or curved flaring of the top around the outlet result in reduced spraying capacities and inferior spray qualities.

The beveled end of inlet pipe 18 extending into the circulation chamber presents a smooth, rounded, diminishing obstruction in the circulating water path. As such, it does not tend to create significant eddy currents or other disturbances of significant character. Above pipe 18 the circulating water flow is entirely unobstructed so that smooth circulating flow is obtained. Because of the internal friction of the water mass in circulation, the water near the center of the circulation chamber tends to move rapidly as does the water at the outside. The spinning water in emerging through opening 28, because of centrifugal action, tends toward an outward movement so that the water separates over the upper edge of opening 28 in droplets forming a cone-shaped spray. The spray pattern, when housing 11 is, say three or four inches in diameter, may be up to about a 40 or 50 foot circle. Wetting is extremely uniform within the spray circle. With larger sprays, the spray pattern may be even larger.

The apparatus as shown may be modified somewhat, by decreasing the vertical distance from conduit 18 down to the bottom plate 14. However, the space between the inlet conduit and the top should not be materially reduced. Placement of the inlet conduit immediately at the bottom of the circulation chamber is objectionable because current interruptions are introduced by the proximity of the bottom of the circulation chamber to the incoming water. As a rule of thumb, the inlet conduit should be spaced from the bottom at least by a distance equal to the outside diameter thereof, and from the top by about twice that distance.

As to the undesirable effects caused when the inlet conduit is substantially larger than the outlet opening, it has been found that when the apparatus as shown in the drawing is modified so that the inlet conduit is of about twice the diameter shown, that is about twice the diameter of outlet 28, then the spray effect is not obtained at all pressures and at higher pressures the water tends to shoot straight upward from opening 28 in a stream. However, when the principles herein set forth are followed, with the inlet conduit of the same inside diameter as the diameter of outlet 28, then internal overpressurization or flooding within the circulation chamber does not occur at any water inflow pressure, however large.

The apparatus shown may be used either as a sprinkler apparatus for placement upon a lawn or other surface, or may be installed, with or without the outwardly extending flange of the bottom plate, as an underground system with the top plates only of the individual sprinkler apparatuses remaining uncovered. The spray cone emitting from openings 28 is such that the top plate 12 may be placed an inch or two below the uppermost surface of the turf, so that the apparatus is out of the way and protected against striking by lawnmowers or other garden tools. The apparatus is substantially insusceptible to damage in any event, however, because its simple and sturdy construction is not easily dented or knocked out of shape or otherwise broken or impaired. The apparatus is preferably made of heavy wall solid metal construction. As indicated mainly in FIG. 3 of the drawings, the top plate 12 is shown to be welded or braised to the cylindrical tube 11 at 30, and the bottom plate is similarly affixed at 31. However, any means for assembling the component parts known to the art may be utilized. However, the construction shown is often to be preferred, since the device as indicated may be made by joinder of two flat plate pieces and one length of pipe, together with the smaller cross section pipe to form the inlet member 18.

The apparatus is substantially insusceptible to plugging. Even though the entire circulation chamber 16 be filled with sand, or dirt twigs, or the like, turning on of the water will in virtually all cases cause complete flushing of the material through opening 28. Even pebbles and gravel are removed from the apparatus in this manner.

While a preferred embodiment of the invention has been shown in the drawings and described, many modifications thereof may be made by persons skilled in the art without departing from the spirit of the invention, and it is intended to protect by Letters Patent all forms of the invention falling within the scope of the following claims:

I claim:

1. Sprinkler apparatus, comprising enclosed housing means having an interior cylindrical circulation compartment, and inlet conduit disposed perpendicularly with respect to the axis of said circulation compartment and substantially tangentially inwardly from the curved wall of said circulation compartment and being slightly laterally spaced from said curved wall inwardly thereof, the inner end of said inlet conduit being beveled to angularly face said curved wall but being spaced therefrom, a circular outlet opening disposed concentrically through an endwall of said housing, said outlet opening being at least substantially as large as the flow opening of said inlet conduit whereby said outlet opening does not form a substantial flow restriction with respect to said inlet conduit flow opening.

2. The combination of claim 1, said inner end of said inlet conduit being beveled at an angle of 33° ± 10° with respect to the axis of said inlet conduit, one end of the bevel being substantially coincident with the curved interior wall of said circulation compartment, the other end of the bevel being spaced from said curved interior wall by a distance substantially equal to the exterior diameter of said inlet conduit.

3. The combination of claim 2, said angle being 33°.

4. The combination of claim 2, said inlet conduit being spaced from the end wall of said housing having said outlet opening by a distance at least about twice the diameter of said inlet conduit and being spaced from the other end wall of said housing by a distance at least about equal to the diameter of said inlet conduit.

5. The combination of claim 4, said outlet opening being directed vertically upwardly and said other end wall of said housing extending outwardly of said housing to form an enlarged base for the sprinkler apparatus.

6. The combination of claim 5, said inlet conduit extending outwardly of said housing and including flow line connection means at its outer end.